United States Patent
Nyström et al.

(10) Patent No.: US 11,664,953 B2
(45) Date of Patent: May 30, 2023

(54) BANDWIDTH SIGNALLING

(71) Applicant: TELEFONAKTIEBOLAGET LM ERICSSON (PUBL), Stockholm (SE)

(72) Inventors: Per Johan Anders Nyström, Uppsala (SE); Pål Frenger, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 17/213,674

(22) Filed: Mar. 26, 2021

(65) Prior Publication Data

US 2021/0218541 A1    Jul. 15, 2021

Related U.S. Application Data

(63) Continuation of application No. 14/556,871, filed on Dec. 1, 2014, now abandoned, which is a continuation
(Continued)

(30) Foreign Application Priority Data

Dec. 30, 2003   (SE) ..................................... 0303607-6

(51) Int. Cl.
*H04W 72/04*    (2023.01)
*H04L 5/00*    (2006.01)
(Continued)

(52) U.S. Cl.
CPC .......... *H04L 5/0094* (2013.01); *H04L 5/0007* (2013.01); *H04L 5/0044* (2013.01);
(Continued)

(58) Field of Classification Search
CPC ............................................... H04W 88/00–06
See application file for complete search history.

(56) References Cited

U.S. PATENT DOCUMENTS

| | | |
|---|---|---|
| 4,039,001 A | 8/1977 | Weldy |
| 5,909,436 A | 6/1999 | Engstrom et al. |

(Continued)

FOREIGN PATENT DOCUMENTS

| | | |
|---|---|---|
| CN | 1348655 A | 5/2002 |
| DE | 19802600 A1 | 8/1999 |

(Continued)

OTHER PUBLICATIONS

3rd Generation Partnership Project, "3rd Generation Partnership Project; Technical Specification Group GSM/EDGE Radio Access Network; Mobile radio interface layer 3 specification, Radio Resource Control (RRC) protocol (Release 4)", Technical Specification, 3GPP TS 44.018 V4.15.0, Jul. 1, 2003, pp. 1-327, 3GPP, France.
(Continued)

*Primary Examiner* — San Htun
(74) *Attorney, Agent, or Firm* — Murphy, Bilak & Homiller, PLLC

(57) ABSTRACT

The invention relates to bandwidth signalling in a multicarrier wireless telecommunication system. The information is transferred in the band itself (bold carriers) and contains information of the size and location of the band (I). The information is repeated in a number of carriers (bold) throughout the band.

13 Claims, 2 Drawing Sheets

Related U.S. Application Data of application No. 10/596,859, filed as application No. PCT/SE2004/002045 on Dec. 29, 2004, now abandoned.

(51) Int. Cl.
  *H04W 28/16* (2009.01)
  *H04W 48/10* (2009.01)
  *H04W 72/23* (2023.01)
  *H04W 72/0453* (2023.01)
  *H04W 56/00* (2009.01)

(52) U.S. Cl.
  CPC ........... *H04W 28/16* (2013.01); *H04W 48/10* (2013.01); *H04W 56/001* (2013.01); *H04W 72/04* (2013.01); *H04W 72/0453* (2013.01); *H04W 72/23* (2023.01)

(56) References Cited

U.S. PATENT DOCUMENTS

| | | | |
|---|---|---|---|
| 6,192,026 B1 * | 2/2001 | Pollack | H04L 5/023 370/329 |
| 6,347,120 B1 * | 2/2002 | Sakoda | H04L 27/2657 455/60 |
| 6,356,540 B1 * | 3/2002 | Kojiro | H04L 5/0044 370/330 |
| 6,377,787 B1 | 4/2002 | Bamburak et al. | |
| 6,539,203 B1 | 3/2003 | Herrig | |
| 6,594,320 B1 * | 7/2003 | Sayeed | H04L 27/266 375/364 |
| 6,650,655 B2 | 11/2003 | Alvesalo et al. | |
| 6,904,283 B2 * | 6/2005 | Li | H04W 72/0406 455/448 |
| 7,039,001 B2 | 5/2006 | Krishnan et al. | |
| 7,386,306 B2 | 6/2008 | Laroia et al. | |
| 2001/0007574 A1 | 7/2001 | Liu et al. | |
| 2002/0031189 A1 | 3/2002 | Hiben et al. | |
| 2002/0145988 A1 | 10/2002 | Dahlman et al. | |
| 2002/0186710 A1 | 12/2002 | Alvesalo et al. | |
| 2003/0081538 A1 | 5/2003 | Walton et al. | |
| 2003/0169681 A1 | 9/2003 | Li et al. | |
| 2003/0224731 A1 | 12/2003 | Yamaura et al. | |
| 2003/0227889 A1 * | 12/2003 | Wu | H04W 16/12 370/335 |
| 2004/0001429 A1 | 1/2004 | Ma et al. | |
| 2004/0081131 A1 | 4/2004 | Walton et al. | |
| 2004/0190640 A1 * | 9/2004 | Dubuc | H04L 27/2608 375/260 |
| 2004/0253952 A1 | 12/2004 | Rager et al. | |
| 2006/0045001 A1 | 3/2006 | Jalali | |

FOREIGN PATENT DOCUMENTS

| | | |
|---|---|---|
| JP | 08331093 A | 12/1996 |
| JP | 2001518766 A | 10/2001 |
| JP | 2002223479 A | 8/2002 |
| JP | 2003229954 A | 8/2003 |
| JP | 2003249908 A | 9/2003 |
| JP | 2011017644 A | 1/2011 |
| WO | 0065798 A1 | 11/2000 |

OTHER PUBLICATIONS

3rd Generation Partnership Project, "3rd Generation Partnership Project; Technical Specification Group GSM/EDGE Radio Access Network; Radio subsystem link control (Release 5)", Technical Specification, 3GPP TS 45.008 V5.3.0 Aug. 1, 2001, pp. 1-100, 3GPP, France.

3rd Generation Partnership Project, "3rd Generation Partnership Project; Technical Specification Group GSM/EDGE Radio Access Network; Multiplexing and multiple access on the radio path (Release 5)", Technical Specification, 3GPP TS 45.002 V5.3.0, Nov. 1, 2001, pp. 1-80, 3GPP, France.

* cited by examiner

BANDWIDTH SIGNALLING

RELATED APPLICATIONS

This application is a continuation of co-pending U.S. patent application Ser. No. 14/556,871 filed Dec. 1, 2014, which is a continuation of U.S. patent application Ser. No. 10/596,859, filed Jun. 27, 2006, now abandoned, which is the National Stage of International Application No. PCT/SE2004/02045, filed Dec. 29, 2004, which claims the benefit of Swedish Application No. 0303607-6, filed Dec. 30, 2003, the disclosures of which are incorporated herein by reference in their entireties.

TECHNICAL FIELD

The present invention relates to signalling of available bandwidth especially in multicarrier wireless telecommunication systems.

BACKGROUND

A tendency of new wireless telecommunication systems is that they often require more bandwidth than existing systems, as new and more demanding services are likely to be introduced by the new systems. However, the available spectrum is limited and it is difficult to identify new spectrum for new communication systems, especially if the new spectrum shall be identical in all different regions of the world. This calls for a need of flexibility with respect to spectrum usage in the sense that pieces of radio spectrum of different size and in different frequency bands should be used with basically the same radio air interface.

For the sake of example, assume that the most demanding applications require that the system bandwidth needs to be 100 MHz. International standardisation and regulatory bodies will therefore have to make sure that there will be ample spectrum available so that a number of 100 MHz bands could be offered to the customers. However, it is also likely that certain regions will have smaller pieces of spectrum available here and there that are smaller than 100 MHz, say a 30 MHz band in one region and a 66 MHz band in another.

One possibility is to design many different air interfaces for a number of bandwidths—say 30, 66 and 100 MHz—and let the base stations and mobile users choose one or several of them depending on the situation, say a 25 MHz air interface for the 30 MHz band, a 50 MHz interface for the 66 MHz band and 100 MHz interface for the 100 MHz band. This however leaves some parts of the spectrum unused: 5 MHz in the 30 MHz band and 16 MHz in the 66 MHz band, while the 100 MHz band is fully used. Even if there is a high degree of commonality between different air interfaces, the complexity of equipment with several air interfaces will be significantly larger than if only one air interface can be used instead.

Another suggestion for better usage of available frequency spectrum is to let several operators share spectrum or rent or buy resources from each other.

SUMMARY OF THE INVENTION

The proposals and ideas referred to above suffers from a number of drawbacks. Already mentioned is that using different air interfaces in several parts of the spectrum causes greater complexity. Another is that available pieces of spectrum might be too big for certain applications, which leads to a waste of resources. Still another problem is how to inform the users of the existence and extent of free spectrum for a certain application at a certain moment in a certain location area. In other words there is a need for greater flexibility and fast allocation of resources whenever the users so request.

The solution is presented in the appended claims relating to a method and means for signalling the availability of spectrum in terms of bandwidth and location.

The invention is advantageously implemented in wireless multicarrier system where the total maximum bandwidth is made up of a large number of narrowband sub carriers like for example in Orthogonal Frequency Divisional Multiplexing, OFDM, Interleaved Frequency Divisional Multiplex, IFDM or similar. In OFDM and IFDM the sub carriers are ideally mutually orthogonal. Generally, very similar systems can be designed with pulse shapes that make the sub carriers slightly non-orthogonal but that have other good properties, for example better spectral properties. This difference does not have a bearing on the invention so when OFDM is mentioned in the examples below, also these other more general types of systems are applicable. The only thing that is important is that the system consists of a large number of sub carriers.

With a multicarrier system it is easy to adjust the used system bandwidth by simply switching off some blocks of sub carriers. However, a problem with this solution is how to inform the mobiles about the size and location of the spectrum that is currently used by the communication system. The invention described here solves this problem by including this size and location information within the sub carriers blocks themselves.

The information about which set of downlink carriers in a block that is available is sent downlink from the base station on an acquisition channel, a broadcasting channel or some other cell covering channel. At least one easily detected downlink channel must be transmitted which is within an operational band known to the mobile user and contains information about where this operational band starts and stops relative to the location of said downlink channel. It is enough if the user has a rough idea of where the operational band can be found. This kind of rough information could have been broadcasted to the user in an earlier cell search.

The format of the information about the size and location of the operational band could vary. Here are some examples:

A start and stop frequency or frequency number is given absolutely or relative to the location of the channel containing this information.

A start frequency or frequency number is given, absolutely or relatively specified, plus a number of maximum carriers or a fraction of that number.

An identifying number where said identifying number identifies an operational bandwidth from a list of predefined operational bandwidths.

The information about the location in spectrum could be explicitly signalled or implicitly derived by synchronisation signals.

As soon as the mobile is informed of the available resources it may access a suitable channel representing its needs in the normal way well known to a person skilled in the art.

BRIEF DESCRIPTION OF THE DRAWINGS

The invention, together with further aspects and advantages is exemplified by reference to a number of embodiments and accompanying drawings wherein.

DETAILED DESCRIPTION

Figure 1:
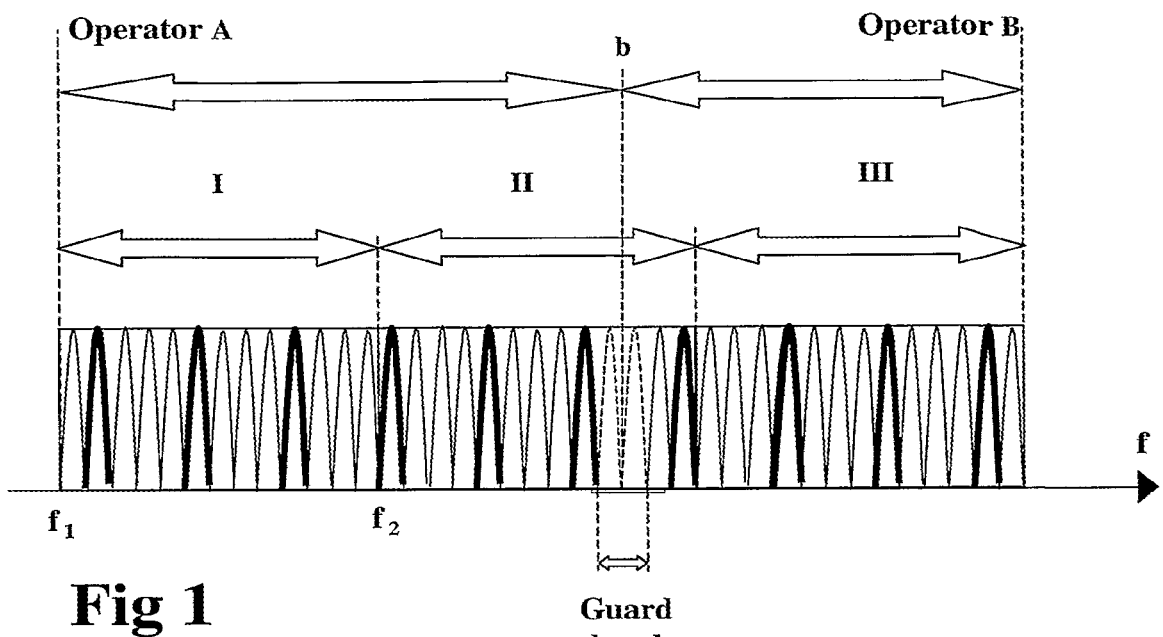
FIG. 1 shows a frequency spectrum exemplifying bands available in a typical situation.

In FIG. 1 a typical spectrum is shown, divided into three blocks or operational bands, I, II and III of 100 MHz, the maximal system bandwidth in this example. The spectrum is partly shared by two operators A and B. A has part I and B has part III while part II is shared between the both operators. It is assumed that, by negotiation between the operators, the border b between A and B is changed from time to time depending on the demand from the subscribers of A and B respectively. The sharing distribution could of course be different. FIG. 1 is just an example.

N is the number of sub carriers in each part. Lets assume that the 100 MHz band is divided into 4096 sub carriers of about 25 kHz each, (i.e. N=4096). In theory any number N could be activated making a large number of air interface bandwidths possible using just one air interface. This is a basic property of these types of systems. An operator can, at different moments, have say 1000, 2000 or 4000 carriers to its disposal, varying with the demands and behaviours of the subscribers.

Assume that the mobile user knows or can guess the approximate location of all N carriers. First the mobile user must detect the presence of one or more acquisition channel(s) for cell search purposes. Such channels are designed so that there is a very small probability to mistake them for other types of signals, or for other types of signals to be mistaken for acquisition signals. In general the user must scan all possible locations to find this signal in order to unambiguously find one. Then the mobile knows that this channel lies within the operational bandwidth. After that, the information in this acquisition channel about the size and location of the actual carrier set is read.

As an example, the acquisition channel is represented by one or more of the bold marked carriers of block I in FIG. 1. Then the information on the acquisition channel tells the user that the band starts at f1 and stops at f2 and that the bandwidth is f2−f1.

Alternatively, based on acquisition channel information, the mobile finds another channel that broadcasts control of the system, and reads the bandwidth information there or part could be read from an acquisition channel and part from another channel that transmits broadcast control information.

The system information bold marked carriers are spread out among all possible sub bands of the operational band. Operator A's signalling is as follows: in the three bold sub carriers to the left in block I, information says that the bandwidth is 100 MHz and all sub bands are used i.e. the whole 100 MHz band, the next three defines a bandwidth of about 70 MHz in block II. Operator B's signalling is as follows: The single bold sub carrier defines a ca 30 MHz system bandwidth in block II, and the next three in block III define a full 100 MHz bandwidth.

Included in FIG. 1 is a piece of unused spectrum in block II that comprises a few sub carriers that act as a guard band between the two generally unsynchronised and uncoordinated operators. This is sometimes beneficial in order to reduce the disturbances between the transmitted signals belonging to the two neighbouring sub bands.

If the operators, in some real time resource exchange or the like, decide that all bandwidth in the second block II should go to operator A, then operator B simply gracefully finalises or reallocates traffic from the allotted carriers in this block, signals that the resource in block II is closed for random access attempts, and stops transmitting in this band, while operator A starts to signal that the entire 100 MHz block is now available for its subscribers.

Since the terminals periodically read bandwidth information from the downlink control channels, this process could be made very quickly, in the order of milliseconds. Also, the terminals have or could have a full bandwidth detector running which makes it trivial to quickly start (de-) multiplexing data (from) to the newly available sub carriers.

In FIG. 1 the bandwidth information is repeated in every forth carrier for illustrative purposes as mentioned above. In practice, however, the distribution is much more thinly spread out in order not to waste bandwidth. In a 4096 carrier band the information may be carried on every 128th or 256th carrier occupying less than one percent of the total bandwidth.

Figure 2:
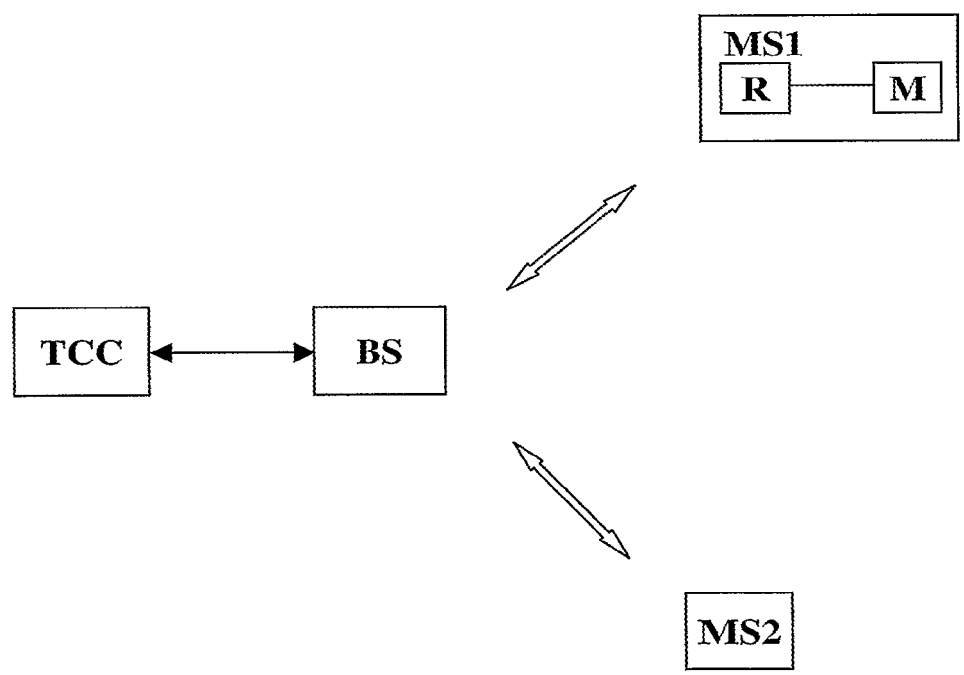
FIG. 2 is an overview of the system according to the invention.

In FIG. 2 an overview of the system according to the invention is shown. A traffic control centre, TCC, is connected over suitable interfaces to a number of base station transceivers BS, only one shown in the figure. The base stations have connections with several mobile stations, MS1 and MS2. The TCC has an over all control of the traffic in the system and one of its tasks is to collect information about the availability of bandwidth of particular parts of radio spectrum used in the system. The information is transferred to the base stations and from there transmitted on a broadcast channel or the like to the users, MS. The TCC is connected to public networks like the Internet. The TCC may also have connections with other TCCs belonging to other operators and after negotiations taking over smaller or greater parts of spectrum from each other.

A user, MS1 in FIG. 2 for example, entering the location area of the system scans the broadcast channel(s) sent out by the base station for information about available bandwidth and location in the spectrum according to the invention. MS1, having received the information in receiver R, stores it into a memory M. After entering the scanning is repeatedly performed for changing conditions and the memory is updated.

The invention solves the problem of the need for the mobiles to have knowledge of available bandwidth. The knowledge is collected from a search of the radio environment for the available resources by detecting system information stored in certain sub carriers in the multicarrier operational bands.

Figure 3:
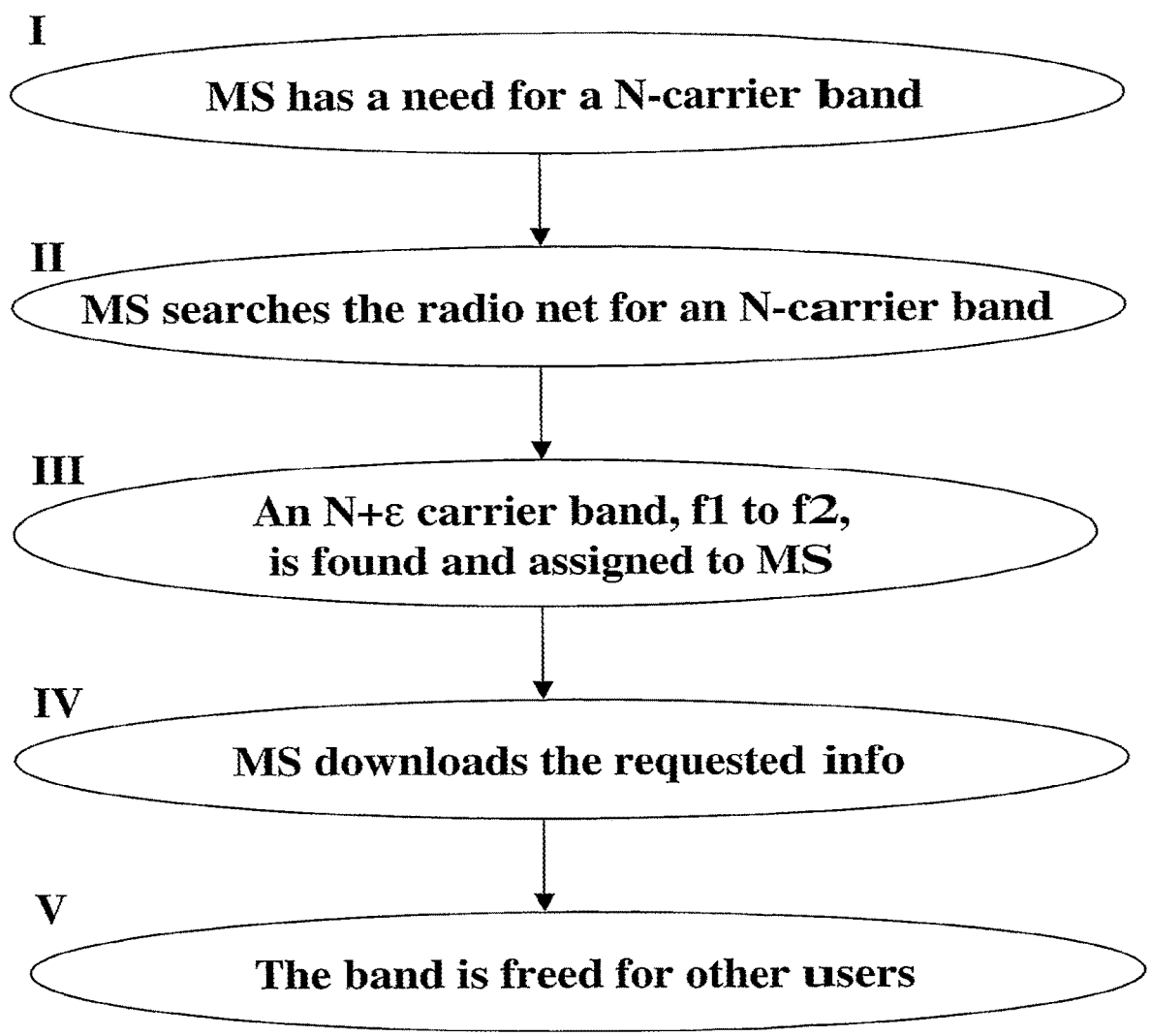
FIG. 3 is a flow chart showing the steps of the invention in a further embodiment.

In FIG. 3, a method for downloading information using the invention is illustrated as a number of steps. In step I, a mobile station, MS, has a need for a multicarrier band with N carriers for the downloading. The MS searches the radio interface in step II.

The search is simplified by the fact that information about the size and location of available bands are stored at specified locations throughout the bands e. g. every $128^{th}$ carrier. The efficiency of the search could be even more enhanced if location and size of suitable bands are prestored in the memory M of the MS. In step III an N+ε carrier band is assigned to the MS. ε is a small number or zero. MS downloads the information in step IV and thereafter the band could be freed for other users, step V.

To conclude the invention has the following advantages:
The base station uses basically the same signalling method for any operational bandwidth.
The mobiles use basically the same detection method for any operational bandwidth.
The mobile user can use the same detector in OFDM-like systems regardless of the bandwidth used in a specific cell at a specific time
The mobile user can quickly detect changes in spectrum allocations.
The invention gives regulators (national or international) flexibility to allocate different sized spectrum pieces for use with basically the same equipment.
The invention gives operators the technical means to trade spectrum in real time.
Furthermore, when regulatory conditions change the operational bandwidth can be changed quickly with the mobile station still being able to follow what is happening.

The invention claimed is:

1. A method performed by a mobile station configured to operate in a wireless telecommunication system, the method comprising:
   upon entering a location area of the wireless telecommunication system, receiving, via an acquisition channel transmitted by a base station in a cell of the wireless telecommunication system, a first part of bandwidth information that identifies one or more bands of radio spectrum that are available in the wireless telecommunication system, wherein the first part of the bandwidth information comprises rough information about the location and the size of the one or more available bands;
   based on the first part of the bandwidth information, identifying a further channel via which the base station broadcasts control information in the cell;
   receiving a second part of the bandwidth information via the identified further channel, wherein the second part of the bandwidth information comprises more precise information about the location and the size of the one or more available bands;
   storing, in mobile station memory, the received first and second parts of the bandwidth information;
   based on the received first and second parts of the bandwidth information, determining a location and a size of the one or more available bands of radio spectrum;
   based on the determined location and size, identifying a plurality of sub-carriers within one of the available bands of radio spectrum; and
   downloading information from the wireless telecommunication system using the identified plurality of sub-carriers.

2. The method of claim 1, wherein one or more of the following is repeated at equally spaced frequency locations within the one or more available bands: the acquisition channel carrying the first part of the bandwidth information, and the further channel carrying the second part of the bandwidth information.

3. The method of claim 1, wherein the bandwidth information includes a start frequency and a stop frequency for each of the available bands.

4. The method of claim 1, wherein:
   the bandwidth information includes one or more identifying numbers; and
   determining a location and a size of the one or more available bands is based on associating each of the identifying numbers with a corresponding entry in a list of bands of spectrum, with each entry having a location and a size.

5. The method of claim 1, wherein the one or more available bands of radio spectrum include a plurality of available bands, with at least one of the available bands being controlled by a different operator than others of the available bands.

6. The method of claim 1, wherein the acquisition channel, including the first part of the bandwidth information, is received by the mobile station during a cell search.

7. A mobile station configured to operate in a wireless telecommunication system, the mobile station comprising:
   a receiver arranged to receive transmissions by base stations of the wireless telecommunication system;
   processing circuitry operably coupled to the receiver; and
   a memory operably coupled to the processing circuitry and containing program instructions that, when executed by the processing circuitry, configure the mobile station to:
   upon entering a location area of the wireless telecommunication system, receive, via an acquisition channel transmitted by a base station in a cell of the wireless telecommunication system, a first part of bandwidth information that identifies one or more bands of radio spectrum that are available in the wireless telecommunication system, wherein the first part of the bandwidth information comprises rough information about the location and the size of the one or more available bands;
   based on the first part of the bandwidth information, identify a further channel via which the base station broadcasts control information in the cell;
   receive a second part of the bandwidth information via the identified further channel, wherein the second part of the bandwidth information comprises more precise information about the location and the size of the one or more available bands;
   storing, in mobile station memory, the received first and second parts of the bandwidth information;
   based on the received first and second parts of the bandwidth information, determine a location and a size of the one or more available bands of radio spectrum;
   based on the determined location and size, identify a plurality of sub-carriers within one of the available bands of radio spectrum; and
   download information from the wireless telecommunication system using the identified plurality of sub-carriers.

8. The mobile station of claim 7, wherein one or more of the following is repeated at equally spaced frequency locations within the one or more available bands: the acquisition channel carrying the first part of the bandwidth information, and the further channel carrying the second part of the bandwidth information.

9. The mobile station of claim 7, wherein the bandwidth information includes a start frequency and a stop frequency for each of the available bands.

10. The mobile station of claim 7, wherein:
the bandwidth information includes one or more identifying numbers; and
execution of the program instructions by the processing circuitry configures the mobile station to determine a location and a size of the one or more available bands based on associating each of the identifying numbers with a corresponding entry in a list of bands of spectrum, with each entry having a location and a size.

11. The mobile station of claim 7, wherein the one or more available bands of radio spectrum include a plurality of available bands, with at least one of the available bands being controlled by a different operator than others of the available bands.

12. The mobile station of claim 7, wherein the acquisition channel, including the first part of the bandwidth information, is received by the mobile station during a cell search.

13. A non-transitory, computer-readable medium storing computer-executable instructions that, when executed by processing circuitry of a mobile station configured to operate in a wireless telecommunication system, configure the mobile station to perform operations corresponding to the method of claim 1.

* * * * *

UNITED STATES PATENT AND TRADEMARK OFFICE
CERTIFICATE OF CORRECTION

| | |
|---|---|
| PATENT NO. | : 11,664,953 B2 |
| APPLICATION NO. | : 17/213674 |
| DATED | : May 30, 2023 |
| INVENTOR(S) | : Nyström et al. |

It is certified that error appears in the above-identified patent and that said Letters Patent is hereby corrected as shown below:

In the Drawings

In Fig. 1, Sheet 1 of 2, delete "FIG 1" and insert -- FIG. 1 --, therefor.

In Fig. 2, Sheet 1 of 2, delete "FIG 2" and insert -- FIG. 2 --, therefor.

In Fig. 3, Sheet 2 of 2, delete "FIG 3" and insert -- FIG. 3 --, therefor.

In the Specification

In Column 1, Line 5, delete "of co-pending U.S." and insert -- of U.S. --, therefor.

In Column 1, Line 6, delete "2014," and insert -- 2014, now abandoned, --, therefor.

In Column 4, Lines 30-31, delete "base station transceivers BS," and insert -- base station, BS, transceivers --, therefor.

In Column 4, Line 33, delete "over all" and insert -- overall --, therefor.

Signed and Sealed this
Tenth Day of October, 2023

Katherine Kelly Vidal
*Director of the United States Patent and Trademark Office*